(12) United States Patent
Shah et al.

(10) Patent No.: US 6,212,506 B1
(45) Date of Patent: Apr. 3, 2001

(54) PER CALL REAL TIME BILLING DISPLAY

(75) Inventors: Nimesh Shah; Lester Son-Hing, both of Plano; Rita D'Ingianni, Richardson; Rodney Glen Adams, Rowlett; Raman Lad, Plano; Garnet Cameron, Dallas, all of TX (US)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 08/931,052

(22) Filed: Sep. 16, 1997

(51) Int. Cl.[7] ........................................ G06F 17/60
(52) U.S. Cl. ......................... 705/418; 377/13; 377/14; 379/111; 379/114; 705/400
(58) Field of Search .................. 377/13, 14, 15, 377/16; 379/100.04, 111, 114; 455/405, 406, 407, 408; 705/30, 400, 418

(56) References Cited

U.S. PATENT DOCUMENTS

| | | | |
|---|---|---|---|
| 2,599,357 | * 6/1952 | Brooks et al. | 379/114 X |
| 3,002,684 | * 10/1961 | Luscher | 377/15 |
| 3,106,613 | * 10/1963 | Mann et al. | 379/114 X |
| 3,294,911 | * 12/1966 | Nightingale | 379/114 |
| 3,512,355 | * 5/1970 | Lang | 379/111 X |
| 3,917,934 | * 11/1975 | Goto | 705/418 |
| 4,041,291 | * 8/1977 | Pavda | 705/418 X |
| 4,065,663 | * 12/1977 | Edwards, II | 705/418 |
| 4,122,308 | * 10/1978 | Weinberger et al. | 379/114 X |
| 4,161,626 | * 7/1979 | Waldo | 379/111 |
| 4,264,956 | * 4/1981 | Delaney | 705/418 |
| 4,445,181 | * 4/1984 | Yatman | 705/418 |
| 4,868,758 | * 9/1989 | Kokubu | 705/400 |
| 5,517,555 | * 5/1996 | Amadon et al. | 455/408 |
| 5,627,887 | 5/1997 | Freedman | 379/144 |
| 5,634,012 | * 5/1997 | Stefik et al. | 705/39 |
| 5,768,521 | * 6/1998 | Dedrick | 705/400 X |
| 5,799,072 | * 8/1998 | Vulcan et al. | 379/111 |
| 5,852,812 | * 12/1998 | Reeder | 705/39 |
| 5,859,902 | 1/1999 | Freedman | 379/144 |
| 5,884,284 | * 3/1999 | Peters et al. | 705/30 |
| 5,923,741 | * 7/1999 | Wright et al. | 379/114 |

* cited by examiner

Primary Examiner—Edward R. Cosimano
(74) Attorney, Agent, or Firm—Vernon Williams; Felsman, Bradley, Vaden, Gunter & Dillon, LLP (57) ABSTRACT

Real-time, per call charge information is provided to a subscriber for calls in progress using a communications system having a service interface supporting the charge display feature. A repository of billing rate information is accessible to the communications system, which selects the appropriate billing rate based on call attributes such as time of day, geographic location, etc. The charge information may be periodically computed within a switch or data processing system within the communications system and transmitted to a remote display device for display. Alternatively, raw billing rate information may be transmitted to an intelligent device at the subscribers location, which periodically computes the charge information and updates the display.

22 Claims, 5 Drawing Sheets

PER CALL REAL TIME BILLING DISPLAY

BACKGROUND OF THE INVENTION

1. Technical Field

The present invention relates generally to communications systems and in particular to billing rate features utilized in conjunction with communications systems. Still more particularly, the present invention relates to providing real-time display of billing charges to a subscriber for calls in progress.

2. Description of the Related Art

The explosion of telecommunications in contemporary society has been accompanied by service providers competing for subscribers by offering a variety of service plans and features with disparate billing rates. The variability of costs for service relating to a particular call has thus become difficult if not impossible for users to monitor. For example, billing rates have conventionally varied depending on factors such as, for example, the time at which a call is placed and the geographic location of the calling party and/or of the called party. More recently, additional factors impacting billing rates have derived from currently activated special features such as call waiting, and from discounts currently in effect for a particular customer.

The advent of variable service plans have further complicated determination of billing rates for particular calls. Different customers may have different rates based on the particular plan subscribed to by the customer. For example, landline service plans are available for flat-rate billing for all calls within most large metropolitan areas having multiple area codes, while wireless service plans offer flat rate billing for particular areas or waiving of roaming charges within certain states. Depending on the long distance or cellular service selected by the customer and the particular plan chosen, different customers may have different rates even though they initiate calls at the same time of the day to and from the same geographic locations.

For budgeting or cost billing purposes, many subscribers--particularly businesses which pass on their costs to customers or clients--desire to know the costs associated with a particular call while the call is being made. Generally, subscribers are required to wait for the monthly statement to learn the billing information associated with a particular call. At best, special arrangements might be made for the customer to learn the billing information when the call is completed. However, a customer wish to limit costs to a prescribed amount has no real-time indication of billing information.

It would be desirable, therefore, to provide subscribers with a display of real-time billing charges for a call in progress. It would further be advantageous if the display of real-time charges could be flexibly implemented to accommodate a subscriber's particular communications hardware.

SUMMARY OF THE INVENTION

It is therefore one object of the present invention to provide an improved communications system.

It is another object of the present invention to provide an improved billing rate feature for use in conjunction with communications systems.

It is yet another object of the present invention to a method and apparatus for providing real-time display of billing charges to a subscriber for calls in progress.

The foregoing objects are achieved as is now described. Real-time, per call charge information is provided to a subscriber for calls in progress using a communications system having a service interface supporting the charge display feature. A repository of billing rate information is accessible to the communications system, which selects the appropriate billing rate based on call attributes such as time of day, geographic location, etc. The charge information may be periodically computed within a switch or data processing system within the communications system and transmitted to a remote display device for display. Alternatively, raw billing rate information may be transmitted to an intelligent device at the subscribers location, which periodically computes the charge information and updates the display.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
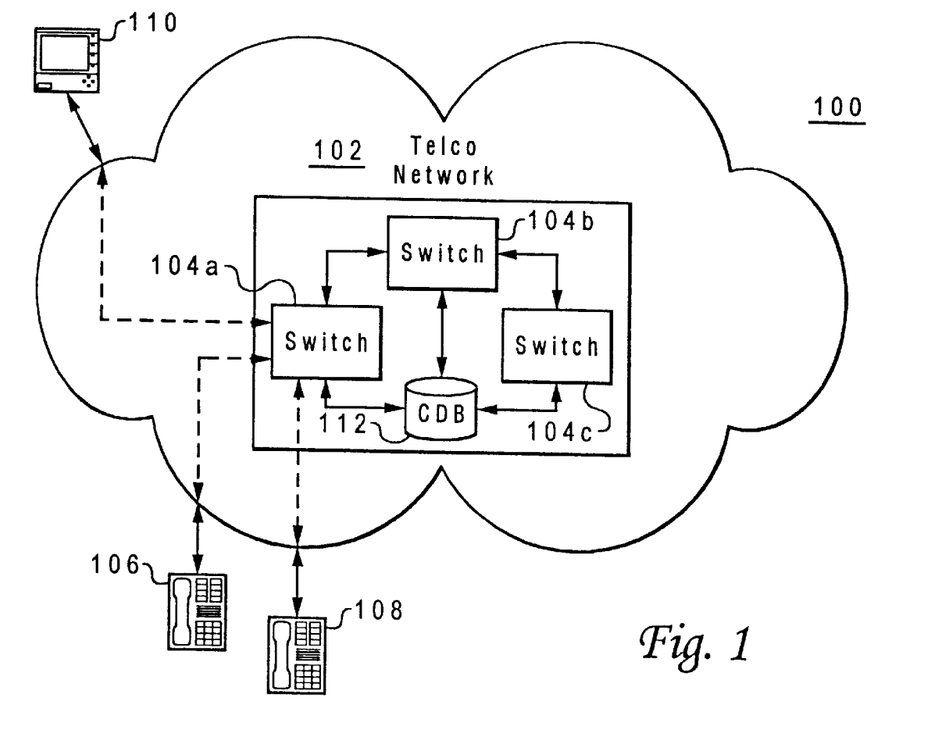
FIG. 1 depicts a diagram of a communications system in which a preferred embodiment of the present invention may be implemented.

With reference now to the figures and in particular with reference to FIG. 1, a diagram of a communications system in which a preferred embodiment of the present invention may be implemented is depicted. Communications system 100 includes a telecommunications network ("Telco network") 102, which may be, for example, a local exchange carrier (LEC), a interexchange carrier (IEC), a hybrid network, or any combination of the three. Local calls within telecommunications network 102 are serviced by the LEC, while the IEC is the service provider for calls within telecommunications network 102 involving long distance service. Where telecommunications network 102 is a hybrid network, the network may include both landline and wireless communications capabilities.

Telecommunications network 102 also includes a number of switches 104a–104c, which establish and route calls between source customer premises equipment (CPE) 106 and target CPE 108. Switches 104a–104c interconnect transmission facilities and are employed to route traffic throughout telecommunications network 102. Transmission facilities provide communications paths carrying a user's voice and network control information between switches in a network. Generally, transmission facilities include a transmission medium, such as, for example, air, copper wires, coaxial cables, or fiber optic cables, along with electronic equipment employed to amplify signals. CPE 106 and 108 (also called station equipment) is generally located at a user's premises. The function of CPEs 106 and 108 is to transmit and/or receive user information, together with exchange control information, with telecommunications network 102 in order to place calls and access services from telecommunications network 102. Although depicted as telephones, CPEs 106 and 108 may be any type of communications unit, such as, for example, a telephone, a computer, or a fax machine. Additionally, CPEs may be an intelligent device 110 having internal processing power sufficient to execute a portion of the processes of the present invention. In any event, the CPE is equipped with a remote display device for displaying real-time billing information in a manner which may be viewed by the subscriber. Additionally, while CPEs 106 and 108 and intelligent device 110 are depicted as connected to the same switch in the exemplary embodiment, each device may be connected to different switches.

Although the exemplary embodiment includes only three switches and two CPEs, these numbers are selected for illustrative purposes only, for simplicity and clarity in describing the invention. Depending on the nature of telecommunications network 100 and the number of customers serviced, other numbers of switches, communications paths, and CPEs may be employed in a variety of configurations. In the illustrative embodiment, telecommunications network 102 is designed and optimized for voice data, although other forms of data may be transmitted. The processes of the present invention may be implemented within a data processing system in telecommunications network 102 such as one of switches 104a–104c, a computer having a connection to one of switches 104a–104c, or in an intelligent device 110 having a display operating in conjunction with a switch such as one of switches 104a–104c.

The processes of the present invention utilize a repository of billing rate information, such as customer database (CDB) 112, and a service interface, such as switch 104a. The billing rate information maintained within customer database 112 may include information regarding a service plan to which the customer subscribes. Thus, separate billing information need not be maintained for each customer within the repository of billing rate information, merely an indication of which service plan billing rate information should be employed. The repository of billing rate information includes information such as geographic location rates, call type rates, time of day rates, plus any customer specific rating information. The service interface provides customers with the ability to activate the feature allowing for display of per call charges in real time, assuming the user has a remote display device capable of displaying the charges. The service interface also monitors any type of change in billing information and updates the repository (customer database) with proper per minute billing information. Although depicted as implemented within a single switch, the service interface may be implemented to operate within all switches within a communications system.

Figure 2:
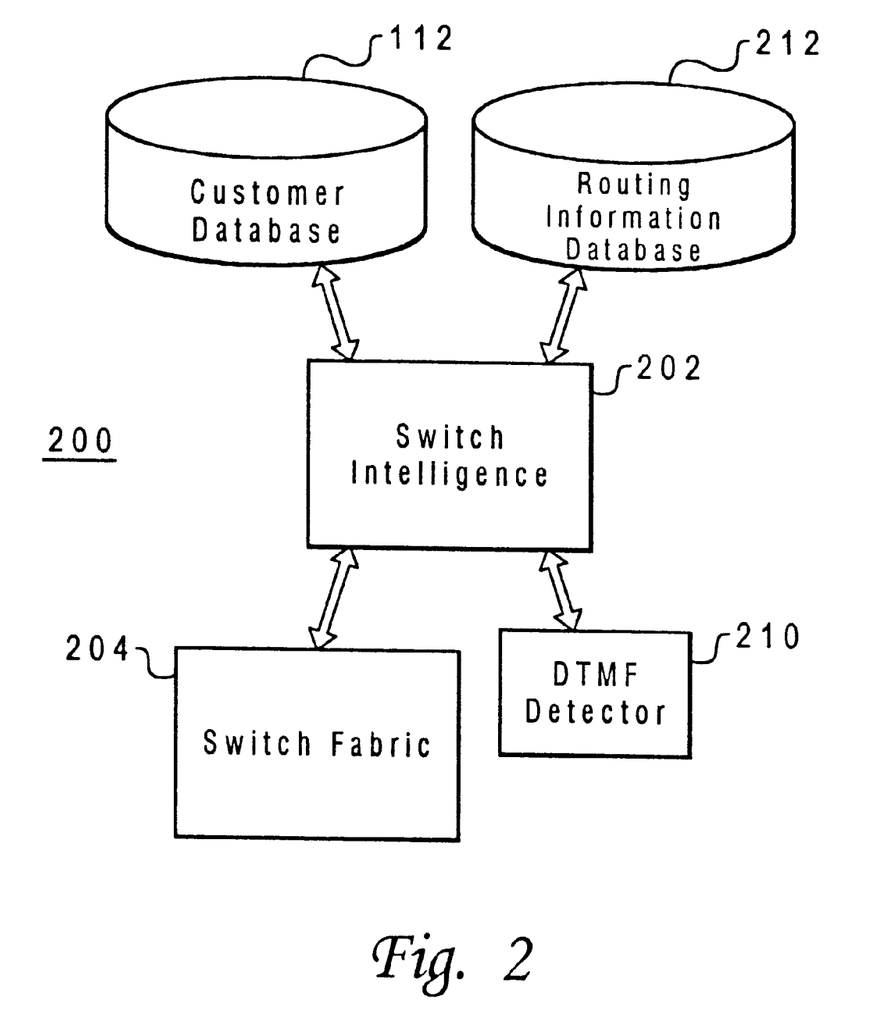
FIG. 2 is a functional block diagram of a communications system in which a preferred embodiment of the present invention may be implemented.

Referring now to FIG. 2, a functional block diagram of a communications system 200 in which a preferred embodiment of the present invention may be implemented is illustrated. Communications system 200 is an example of a data processing system in which the processes of a preferred embodiment of the present invention may be implemented and may be any of switches 104a–104c depicted in FIG. 1. In particular, communications system 200 in FIG. 2 includes hardware depicted as functional units which may implement the various processes required in accordance with a preferred embodiment of the present invention. The functional units described below for communications system 200 may be configured in different physical configurations depending on the particular implementation. Examples of different physical configurations which may be utilized are described below with reference to FIGS. 3A and 3B.

Figure 3A:
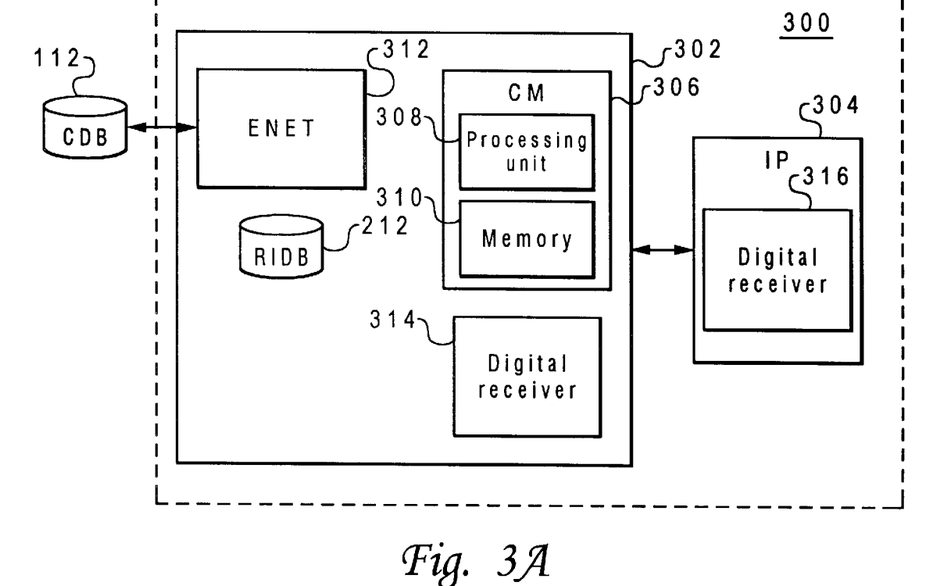
FIG. 3A is a block diagram of a switch in which a preferred embodiment of the present invention may be implemented.
Figure 3B:
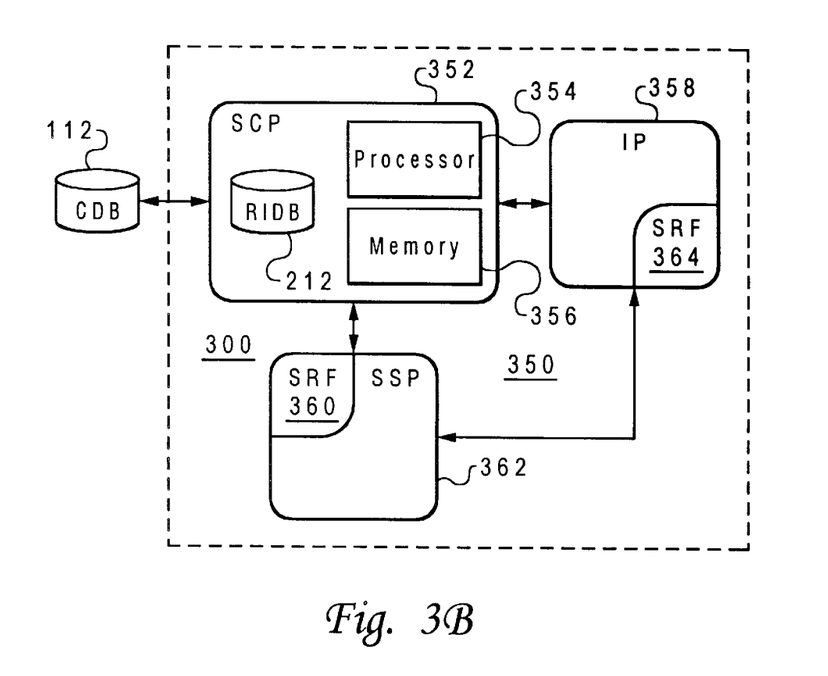
FIG. 3B is a block diagram of physical components in an intelligent network in which a preferred embodiment of the present invention may be implemented.

Communications system 200 in FIG. 2 includes switch intelligence (SI) 202, which provides the logic for call processing and providing automated pre-call query of rate information. Additionally, communications system 200 includes switch fabric (SF) 204, which provides the communications connections and other switch hardware employed to connect callers to the switch and to each other. Communications system 200 also includes a dual tone, multi-frequency (DTMF) detector 210 for detecting DTMF tones that may be transmitted by a user. Depending upon the implementation, voice recognition equipment may be used in place of or in addition to DTMF detector 210. Customer database (CDB) 112 is a database containing information for customers which is utilized to determine rates for calls from a source location to various target locations, including customer rate profile, geographic information used for charge calculations, call attribute rate information, etc. Customer database 112 serves as a repository for billing rate information and may be maintained within a switch as illustrated in FIG. 2, or external to a switch, as depicted in FIGS. 1 and 3A–3B. Routing information database (RIDB) 212 within communications system 200 contains routing information utilized for call processing.

With reference now to FIGS. 3A–3B, block diagrams illustrating different physical configurations for switch components in which a preferred embodiment of the present invention may be implemented are depicted. FIG. 3A is a block diagram of a physical switch 300 representative of the DMS family of switch products available from Northern Telecom Limited in Ottawa, Canada. Switch 300 may be employed within communications system 100 depicted in FIG. 1 as one of switches 104a, 104b, or 104c and provides the functionality illustrated in FIG. 2.

Switch 300 as depicted in FIG. 3A includes central unit 302 connected to intelligent peripheral 304. Central unit 302 contains a computing module (CM) 306, which employs processing unit 308 and memory 310 to provide switch intelligence functions for switch 300. Processing unit 308 may comprise, for example, one or more processors executing instructions to provide logic for call processing and to implement processes described below for a preferred embodiment of the present invention. Memory 310 stores instructions and data and may include random access memory (RAM) and/or read only memory (ROM).

Central unit 302 also includes enhanced network (ENET) 312, which provides a switch fabric function. In FIG. 2, digital receiver 314 provides the DTMF functions. Central unit 302 also includes an integral routing information database 212. Voice server functions for switch 300 are provided by intelligent peripheral (IP) 304, which also contains digital receiver 316. Digital receivers 314 and 316 may provide voice recognition functions in place of or in addition to recognizing DTMF tones. Switch 300 has a connection to customer database (CDB) 112, which is external to switch 300 in the depicted example.

FIG. 3B depicts a block diagram of physical components in an intelligent network 350 representative of a International Telecommunications Union switch, defined by ITU-T Q. 1200. Network 350 may be implemented within telecommunications network 102 as switches 104a, 104b, or 104c in FIG. 1 in accordance with the preferred embodiment of the present invention. Network 350 includes a service control platform (SCP) 352, which is the switch intelligence for network 350. Within service control platform 352 is a processor unit 354 and a memory 356, which contain the processing logic for providing per call real-time billing rate display in the depicted example. Additionally, service control platform 352 also contains a routing information database (RIDB) 212. Network 350 also contains a service switch platforim (SSP) 362, which provides switch fabric functions. Specialized resource functions (SRFs) 360 is found within service switch platform 362. Specialized resource function (SRF) 360 provides DTMF functions for recognizing signals from consumer premises equipment. Intelligent peripheral (IP) 358 also is a part of network 350 and provides voice server functions. Additionally, within intelligent peripheral 358 is specialized resource function 364, which also serves to provide DTMF functions. Alternatively, instead of DTMF functions, specialized resource functions 360 and 364 may be employed to provide voice recognition in place of or in addition to recognizing DTMF tones. Switch control platform 352 is in communication with customer database (CDB) 112, which is external to network 350 in the depicted example.

Although the examples in FIGS. 1, 2, and 3A–3B depict switches as the environments in which the processes of the present invention may be implemented, the processes of may also be implemented in other data processing systems. For example, the processes of the present invention may be implemented within a computer having a connection to a switch, with the computer providing the logic and commands to the switch to execute the processes. Alternatively, the processes may be implemented to operate in an intelligent device operating in conjunction with a switch.

Figure 4:
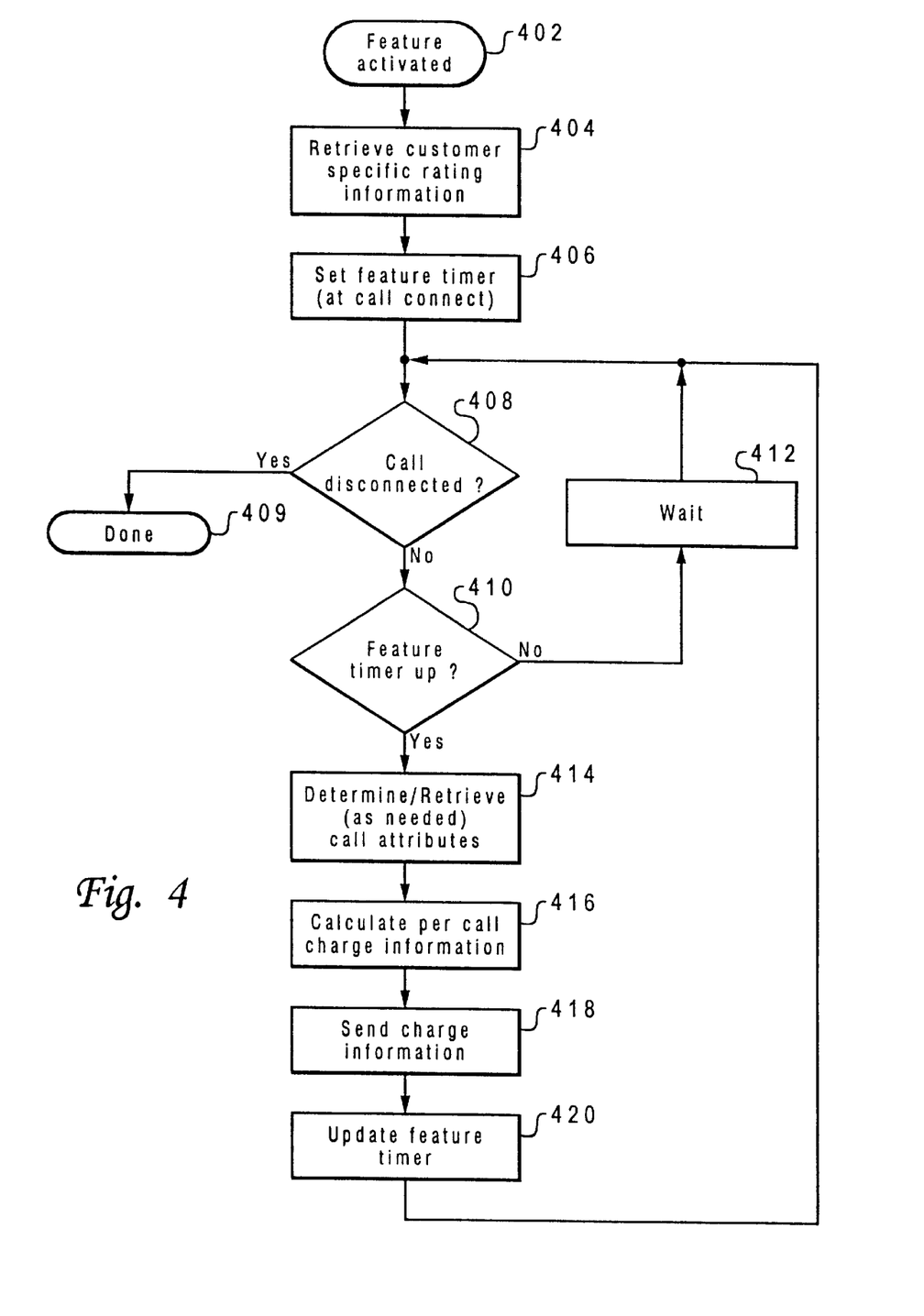
FIG. 4 is a high level flowchart for a process for providing real-time, per call billing information display in accordance with a preferred embodiment.

Referring to FIG. 4, a high level flowchart for a process for providing realtime, per call billing information display in accordance with a preferred embodiment of the present invention. The process begins at step 402, which depicts activation of the per call, real-time billing display feature. The process next passes to step 404, which illustrates retrieving customer-specific rate information from the repository of billing rate information (customer database), and then to step 406, which depicts setting the feature timer for the real-time charge display, at call connect.

The process next passes to step 408, which illustrates a determination of whether the call has been disconnected. If so, the process proceeds to step 409, which depicts the process being completed. If the call has not been disconnected, however, the process proceeds instead to step 410, which depicts a determination of whether the feature timer is up. If not, the process proceeds to step 412, which illustrates the process waiting for a predetermined period of time, and then returning to step 408, described above. If the feature timer is up, however, the process proceeds instead to step 414, which depicts determining and/or retrieving call attributes, such as call type, time of day, geographic location, etc., as needed.

The process next passes to step 416, which illustrates calculation of the per call charge information, and then to step 418, which depicts sending the current charge information to the customer's CPE for remote display. The process then passes to step 420, which illustrates updating the feature time, and returns to step 408 to determine whether the call has been disconnected, as described above. The process shown and describe thus periodically updates the charge information displayed on a display device associated with the customer's CPE, providing real-time charge information.

The process described above may be performed within a switch or data processing system within a communications network, with the computed charge information transmitted to a remote display device associated with the calling party's CPE for display. Alternatively, if the customer's CPE is an intelligent device, the raw billing information for the call could be transmitted to the CPE, with the customer's CPE calculating the charge information for display.

Figure 5:
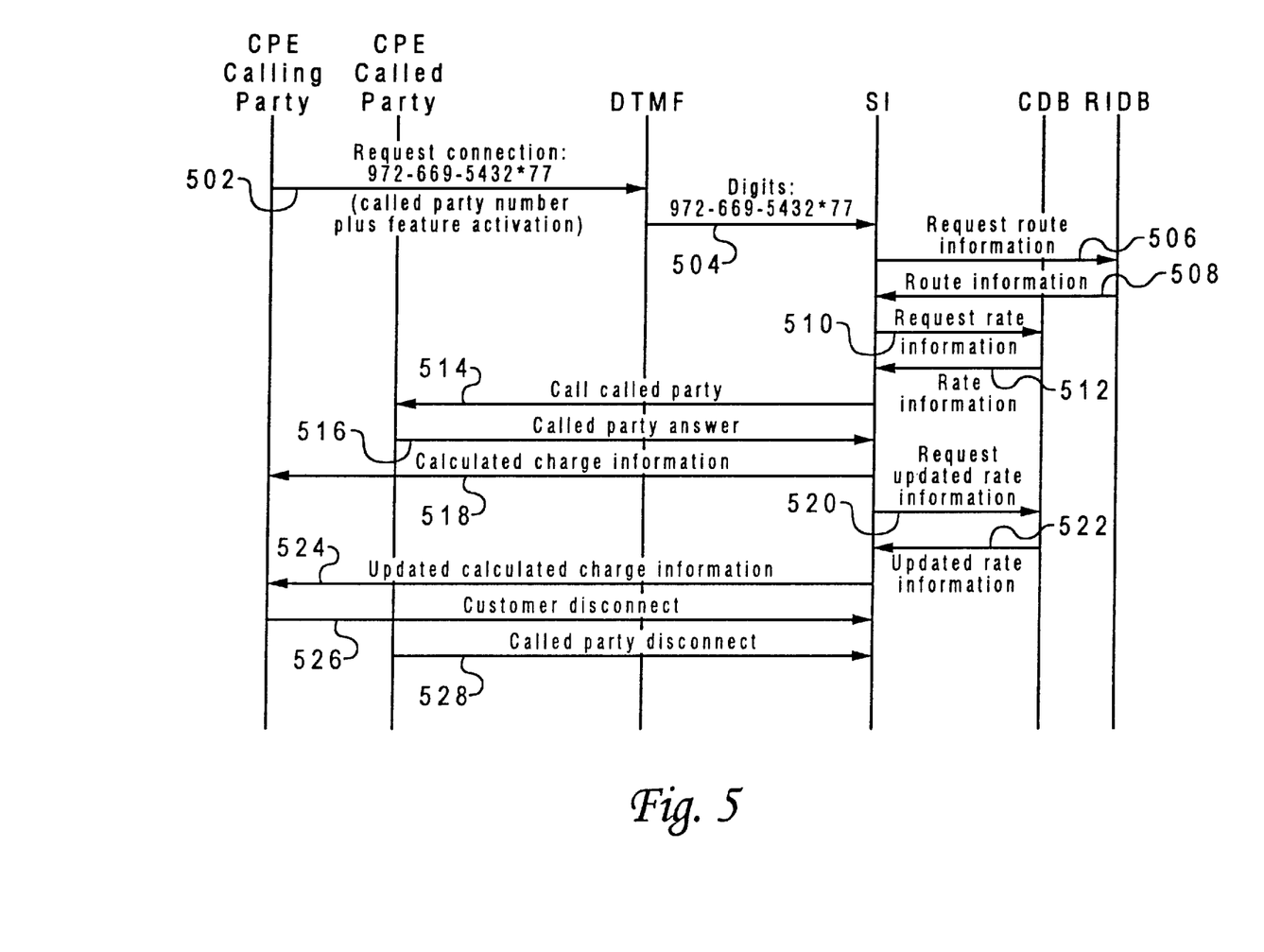
FIG. 5 depicts a message flow diagram for the provision of real-time charge information in accordance with a preferred embodiment of the present invention.

Referring now to FIG. 5, a functional message flow diagram for provision of real-time charge information in accordance with a preferred embodiment of the present invention is depicted. The provision of real-time charge information begins with a customer's (calling party's) CPE transmitting a request for connection to 972-669-5432*77, the called party's number plus a feature activation code, to the DTMF detector, as illustrated by message 502. The DTMF detector then transmits the digits 972-669-5432*77 to the switch intelligence (message 504). The switch intelligence, in turn, requests route information from the routing information database (message 506) and receives the requested routing information from the routing information database (message 508).

The switch intelligence next requests rate information from the customer database (message 510) and receives the requested rate information (message 512). The switch intelligence then calls the called party (message 514), and the called party's CPE answers the call (message 516). The switch intelligence will subsequently calculate the charge information and transmit the calculated charge information to the calling party (customer) CPE (message 518).

It may be necessary during a call to update the rate information utilized in calculating the charge information transmitted to the customer's CPE. In that event, the switch intelligence requests updated rate information from the customer database (message 520) and receives the requested updated rate information from the routing information database (message 522). The switch intelligence then calculates updated charge information, which it transmits to the customer CPE (message 524). The call may be terminated by the customer CPE transmitting a disconnect signal to the switch intelligence (message 526), followed by a similar disconnect signal being transmitted from the called party CPE to the switch intelligence (message 528).

The present invention provides display of real-time, per call billing information to subscribers. Subscribers are thus provided with an indication of the costs of a particular call while the call is in progress, and may utilize this information to determine when to terminate a call. The billing information may be provided in a flexible manner accommodating either intelligent devices utilized by the subscriber or simple remote display devices.

It is important to note that while the present invention has been described in the context of a fully functional communications system, those skilled in the art will appreciate that the mechanism of the processes of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of providing per call, real-time billing display within a communications system, comprising:

responsive to detecting a call within the communication system requiring real-time billing display, querying a database of customer specific billing rate information to determine a billing rate applicable to the call for a customer placing the call; and prior to termination of the call, periodically transmitting current charge information to a display device associated with equipment employed by the customer in placing the call.

2. The method of claim 1, wherein the step of querying a database of customer specific billing rate information further comprises:

retrieving an indication of service plan subscriptions and applicable special discounts.

3. The method of claim 1, further comprising:

prior to updating the current charge information, determining an updated billing rate applicable to the customer for the call.

4. The method of claim 1, wherein the step of determining a billing rate applicable to a customer further comprises:

retrieving billing rate information for the customer; and determining call attributes including time of day, calling party location, called party location, service features activated for the customer, and service plan subscriptions by the customer.

5. The method of claim 4, wherein the step of transmitting current charge information to a display device further comprises:

computing current charge information for the call using the billing rate; and transmitting the computed current charge information to the display device.

6. The method of claim 4, wherein the step of transmitting current charge information to a display device further comprises:

transmitting the billing rate for the call to an intelligent device connected to the display device;

computing current charge information for the call using the intelligent device; and transmitting the computed current charge information to the display device.

7. A method of providing per call, real-time billing display within a communications system, comprising:

retrieving billing rate information from a repository of customer specific billing rate information for a call placed by a customer having a billing display feature activated;

determining a billing rate applicable to the call for the customer;

starting a timer; and upon elapse of a period of a predetermined length, transmitting current charge information to a display device associated with equipment employed by the customer to place the call.

8. The method of claim 7, further comprising:

upon elapse of each period of the predetermined length during the call, updating the current charge information and transmitting the updated current charge information to the display device.

9. The method of claim 7, wherein the step of determining a billing rate applicable to the call further comprises:

retrieving billing rate information for the customer; and determining call attributes of the call including time of day, calling party location, called party location, service features activated for the customer, and service plan subscriptions by the customer.

10. The method of claim 7, wherein the step of transmitting current charge information to a display device further comprises:

computing current charge information for the call using the applicable billing rate; and transmitting the computed current charge information to the display device.

11. The method of claim 7, wherein the step of transmitting current charge information to a display device further comprises:

transmitting the billing rate for the call to an intelligent device connected to the display device;

computing current charge information for the call using the intelligent device; and transmitting the computed current charge information to the display device.

12. The method of claim 7, further comprising:

resetting the timer;

upon elapse of an additional period of the predetermined length, transmitting a new current charge information to the display device; and repeating the resetting and transmitting steps until the call is disconnected.

13. A communications system, comprising:

a plurality of switches routing communications between communications devices for subscribers of the communications system;

a repository of customer specific billing rate information maintained in association with at least one switch within the plurality of switches; and a service interface to the repository of billing rate information allowing a switch within the plurality of switches to determine a billing rate applicable to a call routed for a subscriber of the communications system, wherein, during a duration of the call, the switch transmits billing rate information to a display device viewable by the subscriber.

14. The communications system of claim 13, wherein the switch periodically computes current charge information from the billing rate information and transmits the current charge information to the display device.

15. The communications system of claim 13, wherein the display device is an intelligent display device, the switch transmits the billing rate information to the intelligent display device, and the intelligent display device periodically computes current charge information.

16. The communications system of claim 13, a data processing system connected to the switch periodically computes current charge information from the billing rate information and the switch transmits the current charge information to the display device.

17. A switch, comprising:

switch intelligence providing logic for call processing;

switch fabric providing communications connections requested by the switch intelligence;

a routing information database containing information employed by the switch intelligence in routing calls during call processing;

a customer information database containing billing rate information for users, wherein the billing rate information is employed by the switch intelligence to determine a billing rate applicable, for a customer, to a call routed by the switch; and a service interface transmitting charge information for the call to a display device connected to the switch, wherein the charge information is transmitted to the device at least once during the call.

18. The switch of claim 17, wherein the service interface transmits a computed charge for the call to the display device.

19. The switch of claim 17, wherein the service interface transmits the applicable billing rate for the call to the display device.

20. The switch of claim 17, wherein the service interface periodically transmits the charge information for the call to the display device.

21. A computer program product for use with a data processing system, comprising:

a computer usable medium;

first instructions on said computer usable medium for retrieving billing rate information from a repository of customer specific billing rate information for a call placed by a customer having a billing display feature activated;

second instructions on said computer usable medium for determining a billing rate applicable to the call;

third instructions on said computer usable medium for starting a timer; and fourth instructions on said computer usable medium for transmitting, upon elapse of a period of a predetermined length, current charge information to a display device associated with equipment employed by the customer to place the call.

22. The computer program product of claim 21, wherein the fourth instructions further comprise:

instructions for computing current charge information for the call using the applicable billing rate; and instructions for transmitting the computed current charge information to the display device.

\* \* \* \* \*